W. H. HOLDER.
TEA AND COFFEE POT STRAINER.
APPLICATION FILED JAN. 4, 1912.
1,039,742.
Patented Oct. 1, 1912.
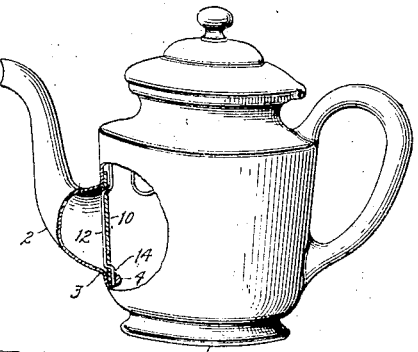
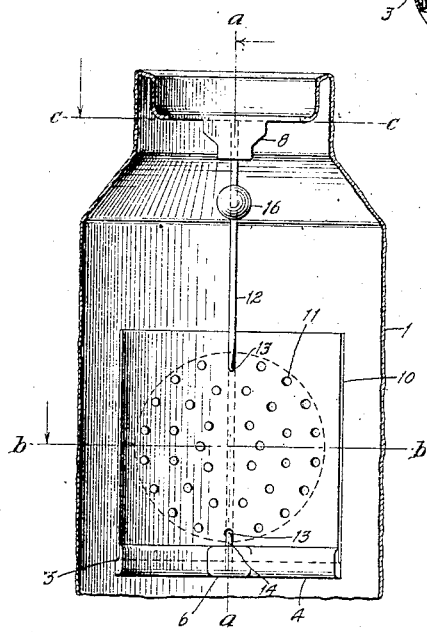
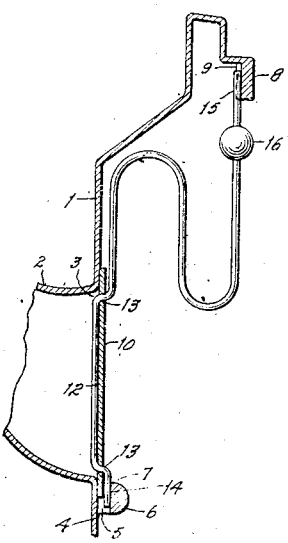
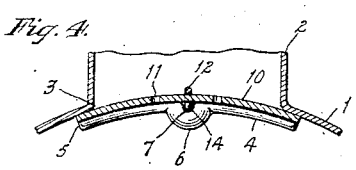
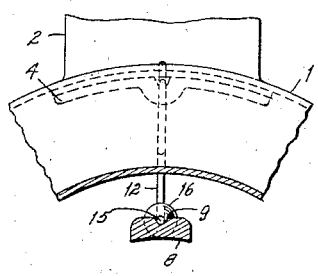
Witnesses:
W. L. Dow.
E. Ichel.
Inventor:
William H. Holder
By A. O. Behel
Atty.

UNITED STATES PATENT OFFICE.

WILLIAM H. HOLDER, OF ROCKFORD, ILLINOIS.

TEA AND COFFEE POT STRAINER.

1,039,742.  Specification of Letters Patent.  Patented Oct. 1, 1912.

Application filed January 4, 1912. Serial No. 669,325.

*To all whom it may concern:*

Be it known that I, WILLIAM H. HOLDER, a citizen of the United States, residing at Rockford, in the county of Winnebago and State of Illinois, have invented certain new and useful Improvements in Tea and Coffee Pot Strainers, of which the following is a specification.

The object of this invention is to provide a removable strainer for tea and coffee pots which can readily be taken out and cleaned.

In the accompanying drawings, Figure 1 is a perspective view of a tea pot containing my improvements, and in which a portion is broken away to show the location of the strainer. Fig. 2 is a vertical section through the wall of the tea pot showing the strainer in position. Fig. 3 is a section on line $a\ a$ Fig. 2. Fig. 4 is a section on line $b\ b$ Fig. 2. Fig. 5 is a section on line $c\ c$ Fig. 2.

The tea or coffee pot 1 is provided with the usual spout 2 located over the opening 3. Below the opening 3 is formed a rest 4 having a groove 5 and a central enlargement 6 provided with a recess 7. The upper portion of the pot near the top opening is formed with a depending projection 8 having a recess 9 in one face thereof. The strainer comprises a rectangular plate 10 curved to conform to the inner face of the lower or body portion of the pot and formed with perforations 11. A rod 12 is connected with the plate 10 by passing through openings 13 therein and having its lower end 14 located in the recess 7. The upper portion of this rod 12 is in the form of an S and its end 15 is located in the recess 9 formed in the projection 8, as shown in Fig. 3.

When the strainer is in the position shown at Fig. 3, the lower end of the plate 10 will rest in the groove 5 and the lower end of the rod 12 will be located in the recess 7. The upper end 15 of the rod will rest in the recess 9 and the spring action of the S shaped upper portion of the rod will hold the plate 10 against the inner face of the body portion of the plate over the opening 3. The ball 16 connected to the upper portion of the rod 12 serves as a thumb and finger hold by which the upper end of the rod can be detached from its engagement with the projection 8, and the strainer removed from within the pot. By thus attaching the strainer it can be readily removed for cleaning and strainers with different sized perforations can be used.

I claim as my invention.

A tea or coffee pot provided with an outlet opening, a rest located below the opening and formed with a groove and a recess, a projection located above the opening and formed with a recess, a removable strainer plate located in the groove of the rest, a rod connected with the strainer plate having one end located in the recess formed in the rest and its other end located in the recess of the projection, and a ball attached to the upper portion of the rod.

In testimony whereof I have hereunto set my hand in presence of two subscribing witnesses.

WILLIAM H. HOLDER.

Witnesses:
 A. O. BEHEL,
 E. D. E. N. BEHEL.

Copies of this patent may be obtained for five cents each, by addressing the "Commissioner of Patents, Washington, D. C."